(12) United States Patent
Ottewill et al.

(10) Patent No.: US 11,604,461 B2
(45) Date of Patent: Mar. 14, 2023

(54) METHOD AND APPARATUS FOR MONITORING THE CONDITION OF SUBSYSTEMS WITHIN A RENEWABLE GENERATION PLANT OR MICROGRID

(71) Applicants: ABB Schweiz AG, Baden (CH); Hitachi Energy Switzerland AG, Baden (CH)

(72) Inventors: James Ottewill, Middlesex (GB); Michal Orkisz, Cracow (PL); Michal Lazarczyk, Cracow (PL); Oscar Apeldoorn, Lengnau AG (CH); Mohamed Eissa, Genoa (IT); RongRong Yu, Beijing (CN)

(73) Assignee: HITACHI ENERGY SWITZERLAND AG, Baden (CH)

( * ) Notice: Subject to any disclaimer, the term of this patent is extended or adjusted under 35 U.S.C. 154(b) by 754 days.

(21) Appl. No.: 16/598,312

(22) Filed: Oct. 10, 2019

(65) Prior Publication Data
US 2020/0044449 A1    Feb. 6, 2020

Related U.S. Application Data

(63) Continuation of application No. PCT/EP2018/000082, filed on Feb. 28, 2018.

(30) Foreign Application Priority Data

Apr. 10, 2017    (EP) .................................... 17460021

(51) Int. Cl.
*G05B 23/02*    (2006.01)
*G05B 13/02*    (2006.01)
(Continued)

(52) U.S. Cl.
CPC ....... *G05B 23/0251* (2013.01); *G05B 13/029* (2013.01); *G06N 3/08* (2013.01); *H02J 13/00006* (2020.01); *H02J 3/003* (2020.01)

(58) Field of Classification Search
CPC ...... G06N 3/08; Y02B 70/3225; Y02E 10/76; Y02E 60/00; Y02E 60/7807;
(Continued)

(56) References Cited

U.S. PATENT DOCUMENTS

| 5,450,527 A * | 9/1995 | Wang .................. G06N 3/0427 706/45 |
| 7,209,846 B2 | 4/2007 | Tamaki et al. |
| 8,452,461 B2 | 5/2013 | Sawyer et al. |

(Continued)

FOREIGN PATENT DOCUMENTS

| CN | 1740934 A | 3/2006 |
| CN | 101110155 A | 1/2008 |

(Continued)

OTHER PUBLICATIONS

European Patent Office, International Search Report & Written Opinion issued in corresponding Application No. PCT/EP2018/000082, dated Jun. 25, 2018, 11 pp.
(Continued)

*Primary Examiner* — Santosh R Poudel
(74) *Attorney, Agent, or Firm* — Slater Matsil, LLP

(57) ABSTRACT

The invention relates to a method and apparatus for monitoring the condition of subsystems within a renewable generation plant or microgrid which are using Supervisory Control and Data Acquisition (SCADA) systems for allowing plant operators to monitor and interact with a plant via human machine interfaces.

14 Claims, 5 Drawing Sheets

(51) Int. Cl.
*G06N 3/08* (2023.01)
*H02J 13/00* (2006.01)
*H02J 3/00* (2006.01)

(58) Field of Classification Search
CPC .. Y04S 20/222; Y04S 40/12; H02J 13/00006; G05B 23/0251
See application file for complete search history.

(56) References Cited

U.S. PATENT DOCUMENTS

| | | | |
|---|---|---|---|
| 10,903,778 B2* | 1/2021 | Nojima | G05B 17/02 |
| 2002/0123856 A1* | 9/2002 | Eryurek | G05B 23/0243 |
| | | | 702/140 |
| 2012/0226682 A1* | 9/2012 | Li | G06Q 30/06 |
| | | | 707/723 |
| 2014/0188410 A1 | 7/2014 | Kerrigan et al. | |
| 2016/0281607 A1 | 9/2016 | Asati et al. | |
| 2017/0016430 A1* | 1/2017 | Swaminathan | G06Q 50/06 |

FOREIGN PATENT DOCUMENTS

| | | |
|---|---|---|
| CN | 102566435 A | 7/2012 |
| CN | 102768115 A | 11/2012 |
| CN | 103323772 A | 9/2013 |
| CN | 103901298 A | 7/2014 |
| CN | 104571099 A | 4/2015 |
| CN | 104614179 A | 5/2015 |
| CN | 105071771 A | 11/2015 |
| EP | 3016277 A1 | 5/2016 |
| WO | 2016077997 A1 | 5/2016 |
| WO | 2016086360 A1 | 6/2016 |
| WO | 2017035629 A1 | 3/2017 |

OTHER PUBLICATIONS

European Patent Office, Extended Search Report issued in corresponding Application No. 17460021.3, dated Sep. 29, 2017, 8 pp.

* cited by examiner

METHOD AND APPARATUS FOR MONITORING THE CONDITION OF SUBSYSTEMS WITHIN A RENEWABLE GENERATION PLANT OR MICROGRID

The invention relates to a method and apparatus for monitoring the condition of subsystems within a renewable generation plant or microgrid which are using Supervisory Control and Data Acquisition (SCADA) systems and/or an IT Server which is deployed locally at the plant level or in a cloud architecture for allowing plant operators to monitor and interact with a plant via human machine interfaces.

BACKGROUND OF THE INVENTION

Unplanned stoppages caused by component failures can impose significant financial penalties on plant operators, both in terms of lost production and because it is typically necessary to rapidly deploy resources to identify and remedy a fault. As a result, tools that continuously monitor the health of various systems, subsystems and components offer the promise of reducing the lifecycle costs of an industrial plant, by enabling operations and maintenance strategies such as condition-based maintenance. In order to be successful, condition monitoring systems must be accurate. Missed alarms, where a failure occurs in a component which was not detected by the condition monitoring system, can potentially lead to component failures, unplanned stoppages and the associated costs. False alarms, where a condition monitoring system indicates a fault in a component where none exists can also increase plant life-cycle costs as unnecessary maintenance actions are implemented. Both missed and false alarms have the effect of diminishing end user confidence in the results of condition monitoring, reducing the likelihood of maintenance decisions being made on the basis of evidence provided by the condition monitoring system. In order to increase the accuracy of condition monitoring systems, additional dedicated sensors, data acquisition, communication and analytics steps may be employed. However, the costs of implementing such advanced solutions can be considerable, potentially negating any benefit gained from employing the condition monitoring system at all.

Various methods require additional data acquisition, processing and communication devices in order to properly function. EP 3016277 A1 describes a method of measuring and estimating magnitudes of operating sub-assemblies in a photovoltaic plant and comparing them with reference values from a reference model. Should a threshold be exceeded a fault message is sent by a local agent to a local agent manager which then verifies the fault by comparing with similar magnitudes from other local agents. By performing the analysis at local agents with data acquisition being acquired and processed close to the monitored object, the invention requires a number of additional devices for data acquisition, processing and communication. These additional devices increase the overall cost of the condition monitoring system, potentially negating any benefits obtained.

A second option is to better use data which is already being acquired from a plant for purposes other than condition monitoring, such as monitoring, control or protection. Supervisory Control and Data Acquisition (SCADA) systems are used to allow plant operators to monitor and interact with a plant via human machine interfaces which describe the links between the various input/output devices such as programmable logic controllers and field devices, such as sensors, that are located throughout a plant. Such systems allow users to adjust controller set points, as well as monitor simple alarms typically associated with measured values ceasing to be within a pre-defined range. As such, data pertaining to the operation and performance of a plant is captured by the SCADA system. By tracking degradation in performance, it is potentially possible to establish the health of the system; information which may be used in a condition-based maintenance policy.

From patent description U.S. Pat. No. 8,452,461 B2 a known example of a supervisory control and data acquisition system for a photovoltaic plant, which specifically monitors both DC and AC power generated in the plant is given. The approach includes a discussion on the storage and transmission of data, although does not explicitly discuss an approach for conducting condition monitoring using the acquired data.

In certain applications SCADA data is already utilized to establish the health of a plant. Typically these analyses are based on standard Key Performance Indicators, for example in photovoltaic applications simple metrics such as performance ratio or availability which are typically calculated on the basis of simple ratios of measured parameters. As previously noted, many SCADA solutions include automatic alarming functionalities, usually associated with measured values ceasing to be within a pre-defined range; such functionalities are more associated with protection rather than tracking general degradation. More advanced solutions allow operators to compare the performance of multiple plants in a portfolio. Again, the simple key performance indicators and alarms previously described, typically form the basis of this comparison.

The aforementioned monitoring approaches, are fundamentally based upon monitoring a certain component or subsystem in a plant using a specific sensor in order to try and ascertain the health of said component or subsystem. The influence of connected elements and the performance of the system as a whole has largely been ignored. Such a constrained view can lead to false and missed alarms as fault signatures are often influenced by the interactions between components. In certain applications, particularly in process plants, multivariate statistical approaches are applied to model the correlations between different measurements in a plant. When a new set of measurements does not adhere to a previously trained statistical model, an alarm is indicated. However, as the outputs of these methods are typically non-dimensional they can be difficult to associate with current and future health states in a system, hence their use in condition-based maintenance strategies is non-trivial. Furthermore, the approaches typically assume the signals within a plant to be linearly related, whereas in practice this is often not the case. This can lead to missed and false alarms, particularly in situations where nonlinear dynamics are excited, such as during set point changes. The two aforementioned limitations are particularly exasperated by the fact that these approaches are typically applied to combine all available measurements in a plant to form a single multivariate statistical model, with no consideration of the topology and architecture of a plant. Such approaches can be less sensitive to subtle changes in individual components within the plant and can be inaccurate as the assumption of linearity ceases to be valid. Also, by combining all available measurements to obtain a single data-driven model of a plant can lead to challenges associated with root-cause analysis; whilst the approaches may be able to identify a problem in a plant, they are unable to pinpoint the cause of the problem. This can lead to challenges in properly planning and executing maintenance actions leading to increased costs and downtime.

From patent description CN 104571099 A a method for analyzing the condition of a photovoltaic plant, including a subsystem for recording the results of a forecasting subsystem, a data-mining subsystem and a fault decision subsystem is described. The system includes a feedback system for improving the fault diagnosis accuracy of the system. In particular, the method describes an updating logic inference approach which combines human knowledge and information extracted from data. Such approaches, which are well known in the state of the art, considers a plant as a whole as opposed to on a component-by-component basis. As such, it is challenging to obtain statistically significant samples of like components or subsystems in a historical database in order to create a logical decision support system with a sufficient resolution.

A number of diagnostics systems based on data-driven modelling approaches have been previously described, however these generally do not provide enough detail in order to diagnose the health of individual components within a system.

From patent description CN 105071771 A a method of training a radial basis function neural network using a simulation model operating under normal conditions is described. Next, measured data is used in the neural network, and estimated values are compared with measured values. Where there is a discrepancy and fault is indicated. By using simulation models to train the network, the method will only be as accurate as the original model; any unmodeled dynamics will result in an alarm. This can increase either the complexity of creating the system due to greater modelling complexity or reduce the accuracy of the system.

From patent description US 20140188410 A1 a method of creating improved models of a photovoltaic system by comparing the ratio between the power output from a system predicted by a model, and that which is measured, for a number of systems, removing statistical outliers and then using the remaining data to update the model using multivariate regression is described. By performing such an analysis, the method allows an average behavior of a system to be identified. However, such a method will not allow subtle individual behaviors of panels to be accounted for. It should be noted that the described method is not explicitly focused on condition monitoring. Nevertheless, should the method be employed for such purposes, it would likely lead to false and missed alarms.

From patent description CN 102566435 A a method of combining total radiation, temperature, wind speed, inverter direct current (DC) input voltage, inverter DC input current, DC input power, an inverter alternating current (AC) output power of the power station using a Kalman filtering process in order to identify problems in the power lines of the power station is described. Again the approach considers a plant as a holistic entity, and does not consider individual subsystems in the plant. This can lead to challenges in root cause analysis.

In patent description WO 2016/077997 a method of monitoring wind turbines using SCADA data is disclosed. The approach involves training models at both the component and system or overall level with historical SCADA data as inputs and fault status obtained from maintenance logs or similar as outputs. New incoming data is input into the trained overall model; if a fault is indicated by this top-level model then the new SCADA data is input to component level models to ascertain the root cause of the problem. The described method utilizes information from a wind turbine report in which the health condition of the turbine is given. Whilst linking data to observed fault status is a strong approach for increasing confidence in a condition monitoring system, such reports are not always readily available, or may be in a format that is not trivially integrated with SCADA data, hence increasing the complexity of configuring the condition monitoring system. Finally, by operating in a two-level hierarchical manner, with initially only a system, or overall level model being evaluated, with component level models only being evaluated should the overall level signal an alarm, the method may be insensitive to particular faults which occur at the component level, but do not have a significant impact on the inputs or outputs to the system overall model.

From patent description WO 2017/035629 a method for generating a solar power output forecast for a solar power plant is disclosed. The approach involves the use of a processor in a training mode in order to train an artificial intelligence model using historical output data and historical input data including historical physical subsystem input data and historical physical subsystem forecasts for the solar power plant. Subsequently, in a runtime mode, the trained artificial intelligence model is applied to current input data including current physical subsystem input data and current physical subsystem forecasts for the solar power plant in order to produce a solar power output forecast for a predetermined forecast horizon. Fundamentally a hybrid physical and artificial intelligence system for solar power forecasting is disclosed. A physical subsystem implements weather research and forecasting and other numerical weather prediction models, satellite imagery processing models, cloud tracking models and solar power plant models and may include other physical model components. An Artificial Intelligence subsystem implements autoregressive integrated moving average ("ARIMA"), regression and other statistical methods and Artificial intelligence methods including artificial neural networks ("ANN"), support vector machines ("SVM") and others. The outputs of the physical subsystem serve as inputs to the artificial intelligence subsystem. By incorporating the artificial intelligence subsystem, discrepancies between a solar power output forecast obtained from physical models and a solar power output actually observed in practice may be minimized. Patent description WO 2017/035629 does not describe a method of automatically identifying inputs and outputs of the physical subsystem, and the models contained within the physical subsystem, from available data. Defining which data may be considered as input data and which may be considered as output data is not always a trivial exercise. Typically in the state of the art, the selection of input and output data is performed manually. Performing such actions manually can be an extremely time-consuming, labor-intensive task, with high probability of human error. This is particularly true in the case of a large utility scale plants, which may contain many multiples of panels, strings, inverters. It should also be noted that the method described in patent description WO 2017/035629 is not explicitly focused on condition monitoring however it does disclose the step of announcing to an authorized operator when a forecast error increases above a certain limit or threshold, either by sending a text message or email to an authorized operator. The aim of this step would be to provide information to the operator that the statistical models should be retrained based on recent data. If the described approach were to be utilized for condition monitoring, it would suffer from various drawbacks. Firstly, whilst the described approach is suitable to obtain an improved forecast of the total solar power output of a plant, it would not for accurately estimating the current output from each individual subsystem within a plant.

Hence, using the described method, it would be extremely difficult to distinguish to subtle changes in individual components within the plant from modelling errors in individual models in the physical subsystem. As a result, if the approach were to be used for condition monitoring, it would be insensitive to particular faults which occur at the component level, but do not have a significant impact on the inputs or outputs to the system overall model. Furthermore, should an error be determined it would not be possible to pinpoint the components within the plant where the problem had occurred. This would lead to challenges in properly planning and executing maintenance actions leading to increased costs and downtime, particularly in large utility scale plants with many multiple components.

SUMMARY OF THE INVENTION

In this invention a method and apparatus for monitoring the condition of subsystems within a renewable generation and/or microgrid system, henceforth referred to as a plant, is disclosed. The invention includes the novel step of automatically identifying the subsystems and data associated with said subsystem in a renewable generation and/or microgrid system on the basis of supervisory control and data acquisition data (SCADA) and/or an IT Server which can be deployed on site in the plant or in a cloud based architecture, and using this data to train data-driven models of each subsystem in the plant. A subsystem may be an individual component, for example a photovoltaic panel or a collection of connected components, for example a number of photovoltaic panels connected to an inverter DC/DC booster stage. Historian data is used to train data-driven models describing the relationship between inputs to outputs of each subsystem in the plant. One or more metrics indicative of the difference between the outputs of the trained data-driven models when the historian data is used as inputs and the equivalent measured values obtained from the historian data are calculated. Alarm thresholds are automatically set for each metric associated with a trained data-driven model of a subsystem. Once the data-driven models of subsystems within the plant have been trained, new supervisory control and data acquisition data from the plant may be used as inputs to each model in order to obtain estimates of subsystem outputs. The one or more metrics indicative of the difference between the outputs of the trained data-driven models when the new data is used as inputs and the equivalent measured values obtained from the new data are calculated and compared with the alarm thresholds. The metric values are combined in order to provide a global health metric, indicative of the current health of the plant. Where a metric exceeds an alarm threshold, a fault event is indicated to the end user highlighting the subsystem within the plant which is exhibiting faulty behavior. Furthermore, metric values for each subsystem may be trended over time and future values of metrics predicted. The metrics and associated fault events may be evaluated both at a local plant level, or at a fleet level.

The method according to the invention is realized according to claims 1 to 11.

The invention links advanced data analytics solutions for condition monitoring of renewables plants and/or microgrids, which may be comprised of photovoltaic panels, wind turbines, diesel generators, storage with supervisory control and data acquisition (SCADA). In this way, there is no need for the SCADA systems and condition monitoring systems of a plant to be configured separately. As a result the engineering effort associated with configuring and commissioning the condition monitoring system is reduced. Furthermore, because sensors and data acquisition protocol stacks already incorporated into the SCADA system are used to perform advanced condition monitoring, no additional condition monitoring sensors are necessary. This reduces the cost of the monitoring solution, reducing the necessity for additional sensors, cabling and communication hardware.

The invention improves on existing approaches through its incorporation of the structure of the plant into the condition monitoring analytics, which increases the accuracy of the condition monitoring system. Specifically, the solution is able to automatically identify individual elements or subsystems in the plant, and build data-driven models describing how outputs vary with inputs for a given component or sub-system. As such a tailored condition monitoring solution may be employed. More precisely, by employing a data-driven approach the condition monitoring system is able to account for the specifics of the plant under consideration. For example in a photovoltaic plant, variables such as tilt, tracker position, or atmospheric transmittance may be accounted for without detailed configuration by the end user. This reduces the likelihood of false or missed alarms. Furthermore, in contrast to data-driven approaches which combine all available data within a plant, the inventive method is both more robust, allowing nonlinearities in the plant dynamics to be better accounted for, more accurate, allowing subtle changes indicative of incipient faults in specific elements to be identified and also is better suited to root-cause analysis.

Similarly as plant set point changes are controlled by the SCADA system, this information may be utilized by the condition monitoring system. Therefore, changes in operating conditions may be accounted for in the condition monitoring system, reducing the likelihood of false alarms.

Additionally, by considering the plant structure in the condition monitoring system, it is easier to extract information about the elements utilized in the plant, which in turn increases the ease of comparing like for like systems from across a fleet. This improves reliability and robustness as alarm data-driven models and alarm thresholds, optimized from across the fleet may be utilized for a particular installation. As the same SCADA system may be used for a variety of applications (e.g. Wind, Solar PV, Hydro, etc.), it is easier for a plant owner who owns different types of plant to compare systems, thus allowing them to optimize their operations and maintenance of their fleet, and maintenance of their fleet, and linking to the root cause of the detected failures.

DETAILED DESCRIPTION OF THE INVENTION

Figure 1:
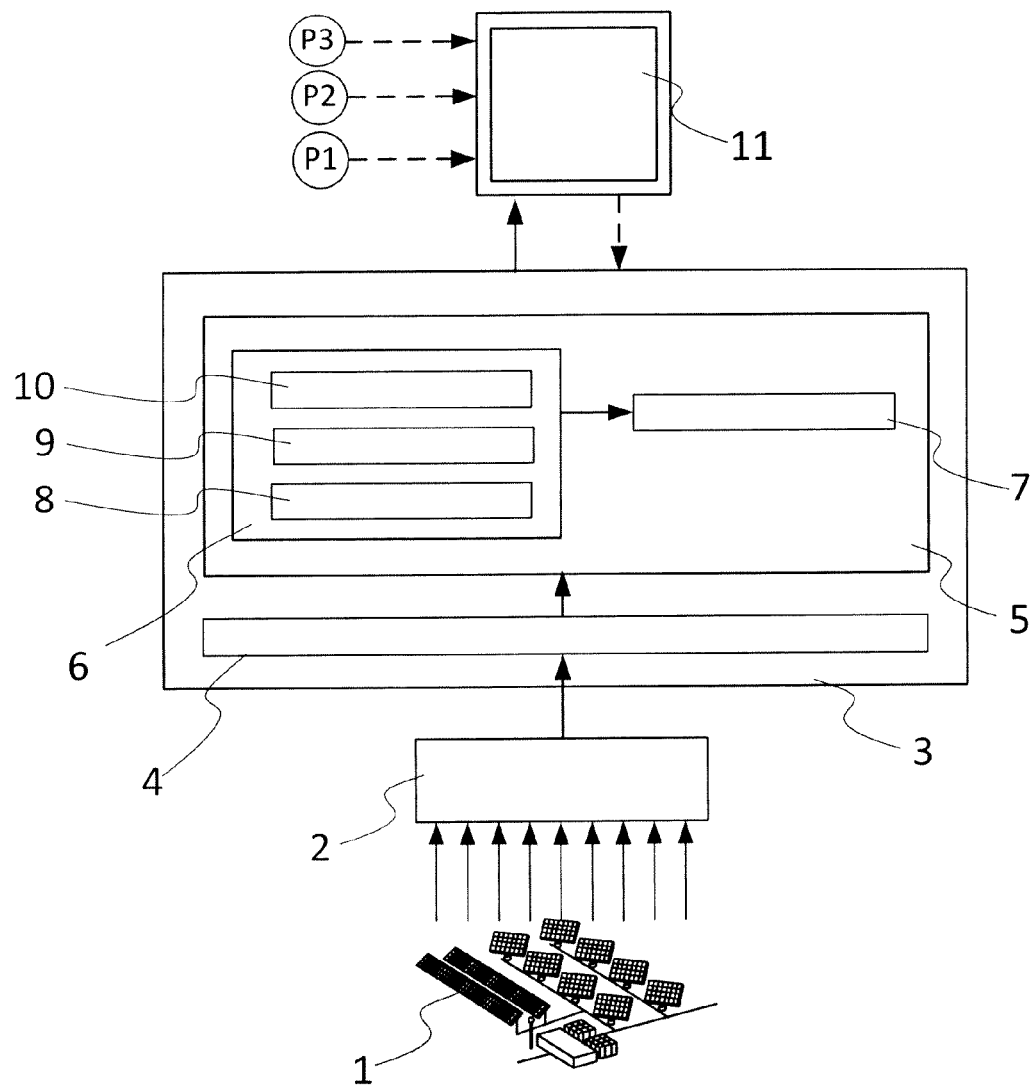
FIG. 1 is a picture of a renewable generation and/or microgrid system together with schematic view of the apparatus which may be used in the implementation of the present invention.

Referring to FIG. 1 there is depicted an example schematic of a physical realization of the invention. A plant 1 is controlled and monitored by a Supervisory Control and Data Acquisition or SCADA system 2. In this described example embodiment, we describe a photovoltaic plant, however, the invention is valid for any system monitored using a SCADA system. Data pertaining to the operation of the plant 1 is measured by a number of field devices connected to a number of input output devices, neither of which are depicted in FIG. 1, which in turn provide data to the SCADA system 2. The SCADA system is connected to a computer device 3, with a communication module 4 and a data processing unit 5. A data storage module which, for example, may take the form of a historian, is not depicted in FIG. 1 but is included, and may be contained within the SCADA system, in the computer device 3 or elsewhere (e.g. external storage). In the data processing unit 5 a model training module 6 and a condition assessment module 7 are implemented. The model training module 6, contains data preparation 8, model construction 9 and data-driven training 10 functional submodules. The computer device 3 is able to communicate the results of the inventive method to a user interface 11 in which the results of the invention are presented to the user. The user interface 11 could be a monitor, a printer, a mobile device such as a smart phone or tablet or any useful device for presentation of the results of the invention. Additionally the user interface 11 might optionally be used to supply parameter set P1, parameter set P2 and/or parameter set P3 to the computer device 3 for use in realizing the inventive method. The meaning of the parameter set P1, P2 and P3 is explained in the corresponding steps of the method.

Figure 2:
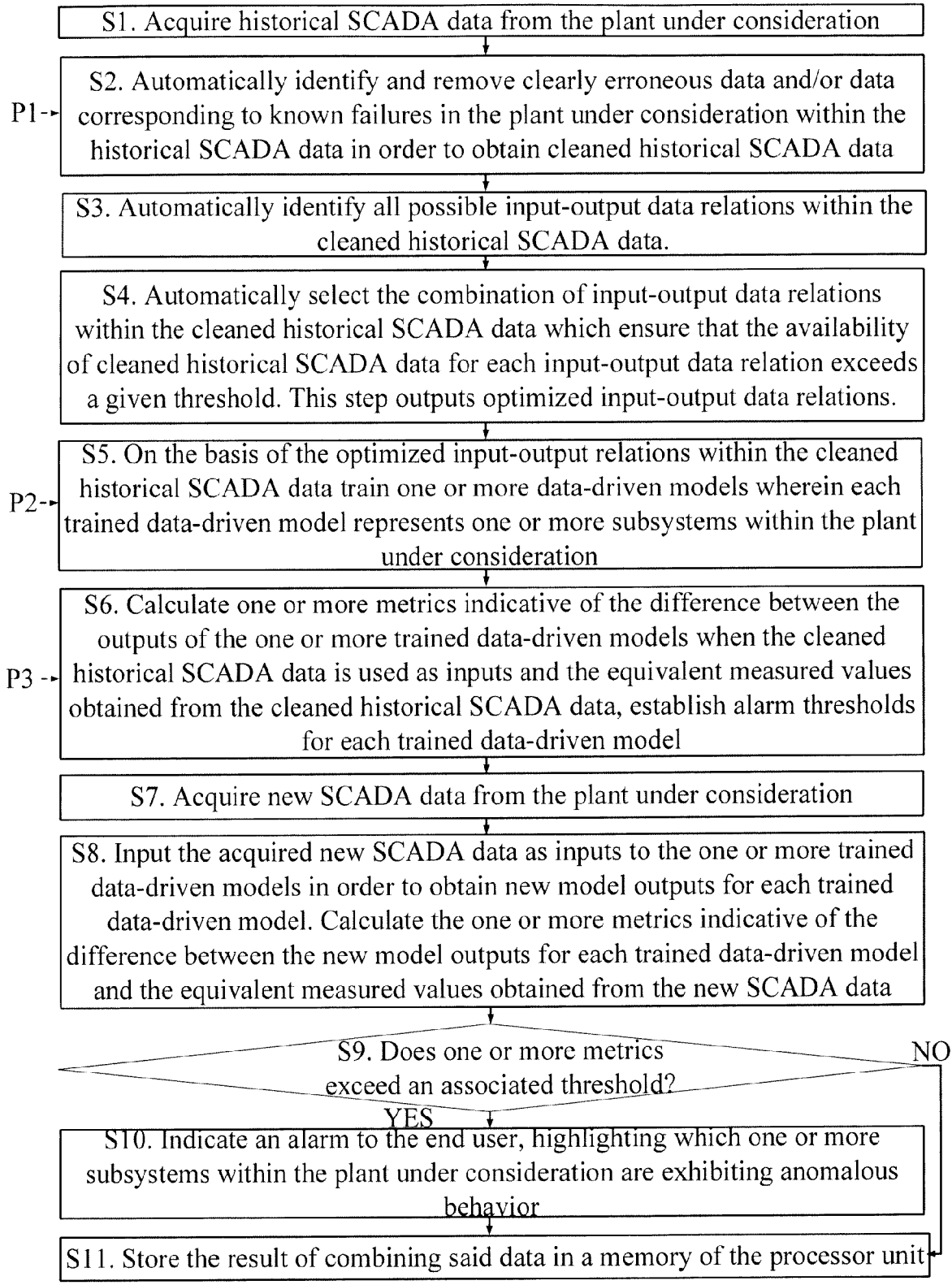
FIG. 2 presents a diagram of operations performed for monitoring the condition of subsystems within a renewable generation plant or microgrid in accordance with the first embodiment of the present invention.

The preferred embodiment of the inventive method is implemented according to the steps S1-S12 shown in FIG. 2.

Step S1

With reference to the system shown in FIG. 2 in step S1 data pertaining to the operation of the plant 1 which has previously been measured by a number of field devices connected to a number of input output devices from the SCADA system 2 is acquired from the data storage module which, for example, may take the form of a historian. We will refer to this data as historical SCADA data. As such the historical SCADA data contains one or more signals, each formed of one or more data points. Examples of signals which might be stored within such historical SCADA data for a photovoltaic plant include horizontal irradiance, ambient temperature, humidity, output power from inverter DC/DC booster stages, and output power to the grid. These signals may be acquired from a number of sources, ranging from dedicated sensors, such as those mounted on a weather station or embedded into devices such as inverters, through to data imported from local meteorological stations. Those skilled in the state of the art will also recognize that a wide range of other signals might also be incorporated into the SCADA system. The historical SCADA data is stored as tags, or points, which associate the recorded signals with specific devices within the plant 1. As an output of this step, the historical SCADA data is delivered to step S2. Step S1 is performed by the communication module 4 in the computer device 3. The historical SCADA data is provided to the model training module 6 of the data processing unit 5.

Step S2

In step S2, the historical SCADA data delivered from step S1 is automatically analyzed in order to identify and remove clearly erroneous or superfluous data as well as optionally allowing the user to select signals and signal points to remove via the parameter set P1, which is optionally delivered via the user interface 11. The resulting output of step S2 is the cleaned historical SCADA data, which is identical to the historical SCADA data but with clearly erroneous, superfluous and user-selected data removed. The optional parameter set P1 includes the start date for the cleaned historical SCADA data, the end date for the cleaned historical SCADA data, a list of data points to omit from the cleaned historical SCADA data, a list of signals to omit from the cleaned historical SCADA data, a local longitude of the plant 1, a local latitude of the plant 1, a minimum signal availability, and a minimum yield. As noted each of these parameters is optionally supplied to the system.

Does the Data Point Occur Before the Start Date of the Training Measurements?

Optionally, the user may provide a start date for the cleaned historical SCADA data via the parameter set P1. If a user does not provide a start date for the cleaned historical SCADA data, the data point with the earliest associated timestamp within the historical SCADA data is taken as the start date for the cleaned historical SCADA data. Any data points with associated timestamps that are earlier than the start date for the cleaned historical SCADA data are omitted from the cleaned historical SCADA data.

Does the Data Point Occur after the End Date of the Training Measurements?

Optionally, the user may provide an end date for the cleaned historical SCADA data via the parameter set P1. If a user does not provide an end date for the cleaned historical SCADA data, the data point with the latest associated timestamp within the historical SCADA data is taken as the end date for the cleaned historical SCADA data. Any data points with associated timestamps that are later than the end date for the cleaned historical SCADA data are omitted from the cleaned historical SCADA data.

Does the Data Point Occur During a Night-Time Period?

If a local longitude of the plant 1 and a local latitude of the plant 1 have either been supplied to the system via parameter set P1, or are contained within the historical SCADA data, then the solar altitude angle may be calculated for each timestamp contained within the historical SCADA data. When the solar altitude angle falls below a threshold value it is assumed that it is night time at the plant location. Whilst the threshold value may take any value, a representative value would be −0.83 degrees, which is taken as the default. Data points within the historical SCADA data which have an associated timestamp which relate to periods of night time are omitted from the cleaned historical SCADA data.

Does the Day on which the Data Occurs Contain Clearly Erroneous Data?

The historical SCADA data may be evaluated on a day-by-day basis in order to ascertain whether or not the data recorded on a particular day contains some clear abnormalities. The following checks may be performed on each signal contained within the historical SCADA data. A number of data cleaning methodologies known in the state of the art may be applied in order to identify clearly erroneous data. For clarity, we provide five examples of data cleaning checks which may be performed in order to identify clearly erroneous data:

1. Does a signal contained within the historical SCADA data contain a number of equal non-zero values greater than or equal to a threshold value?
2. Does a signal contained within the historical SCADA data have more than six consecutive data points missing?
3. For a given day, Does a signal contained within the historical SCADA data contain less than 50% of the median number of data points stored in a day (as calculated by considering the number of data points available on each day for the period given by the training start date and training end date)?
4. Does a signal contained within the historical SCADA data only have constant zero values on the day under consideration (standard deviation is zero, all values equal zero)?
5. Does a signal contained within the historical SCADA data not have any data points recorded on the day under consideration?

Any data points within the historical SCADA data, where the above criteria are adhered to are omitted from the cleaned historical SCADA data. Those skilled in the state of the art will know that there are a multitude of data cleaning algorithms known to those skilled in the state of the art which may be utilized in this step without exceeding the scope of the intended invention.

Does the Signal Give the Same Information as Another Signal Also Contained in the Historical SCADA Data?

The historical SCADA data may contain multiple signals which provide the same information as another signal but to differing accuracies. For example, a temperature signal measured from a weather station mounted at the plant will be more accurate than a temperature measured from a local meteorological site. Tags contained within the historical SCADA data may be automatically compared against one another. Should a tag be identified as redundant, it is omitted from the cleaned historical SCADA data.

Does the Data Point Relate to Known Failures or Poor Performance in the Plant?

If the historical SCADA data contains information on events that have occurred in the plant 1 (e.g. plant shutdown) then data points within the historical SCADA data which have an associated timestamp which relate to event periods are omitted from the cleaned historical SCADA data.

Has the Data Point been Selected by the User for Removal?

Optionally, the user may define list of data and data points contained within the historical SCADA data via the parameter set P1. These data and data points are subsequently omitted from the cleaned historical SCADA data.

Those skilled in the state of the art will recognize that there are further data pre-processing steps that are known in the state of the art that may be performed at step S2. The output of step S2 is the cleaned historical SCADA data, which is identical to the historical SCADA data but with clearly erroneous, superfluous and user-selected data removed.

Also at step S2 signals and data contained within the historical SCADA data may be aggregated for example, via down sampling. Signals and data contained within the historical SCADA data may also be time synchronized using methods known in the state of the art, such as nearest neighbor interpolation. Furthermore, signals and data contained within the historical SCADA data may be combined in order to generate new, derived signals, for example, combining current and voltage to create a power signal, or by combining plant longitude, plant latitude and historical timestamps in order to calculate solar azimuth and solar altitude angles. The output of step S2 is the cleaned historical SCADA data, which is identical to the historical SCADA data but with clearly erroneous, superfluous and user-selected data removed, and aggregated and/or derived signals incorporated. Step S2 is performed in the data preparation 8 functional submodule of the model training module 6. The cleaned historical SCADA data is provided to the model construction 9 submodule.

Step S3

In step S3, the cleaned historical SCADA data delivered from step S2 is automatically analyzed in order to identify all possible input-output data relations within the cleaned historical SCADA data. The cleaned historical SCADA data includes information which associates the recorded data with specific devices within the plant 1. At step S3 the system automatically analyzes the tags stored within the cleaned historical SCADA data in order to identify the physical structure of the plant 1 in terms of elements (e.g. number of strings, number of stringboxes, number of inverter DC/DC Booster Stages, etc.). The system identifies signals related to weather and also identifies the signals related to each element in the plant. If a power reading associated with a particular element in the plant 1 is available, this is taken as the output signal of the component. The system also identifies all signals of a particular element which may be considered as an input to the component under consideration (e.g. it would identify the output current, voltage and power recorded at a stringbox as an input to an inverter DC/DC booster stage). If no input signals are available for a given component, weather signals are taken to be the input. In this way, signals are mapped to inputs and outputs of each element in the plant 1, allowing a list of all possible input-output relations in the plant 1 to be created.

Figure 3:
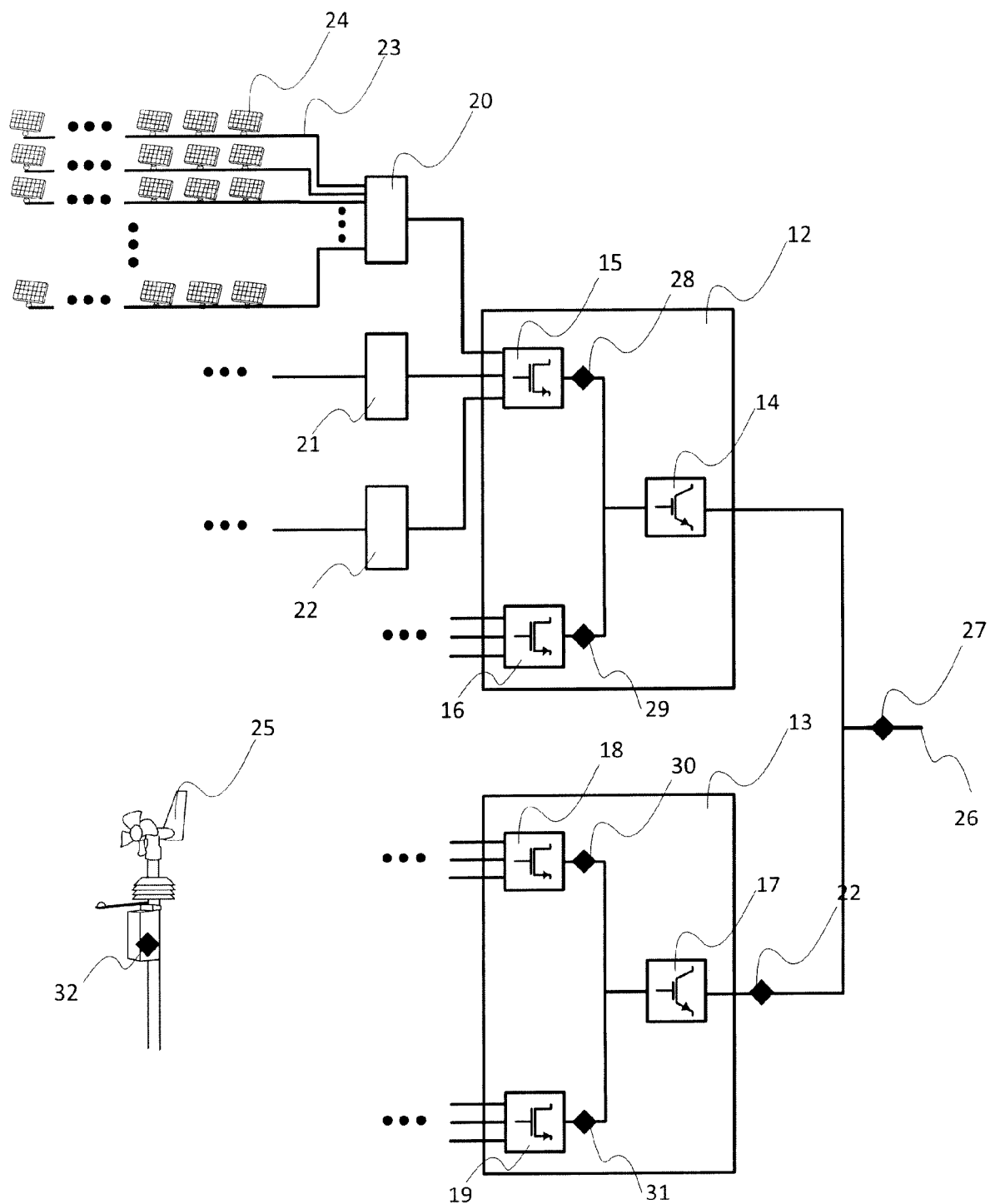
FIG. 3 is a schematic representation of the individual elements or subsystems that may comprise a plant the condition of which may be monitored using the present invention.

To illustrate this concept, and with reference to FIG. 2, let us consider the example of a plant comprised of a first solar inverter 12, and a second solar inverter 13. The first solar inverter 12 contains a DC/AC inverter 14 and two inverter DC/DC Booster Stages 15 and 16. Similarly, the second solar inverter 13 contains a DC/AC inverter 17 and two inverter DC/DC Booster Stages 18 and 19. The first DC/DC Booster Stage 15 of the first solar inverter 12 is connected to three string boxes 20, 21, 22, which in turn are each connected to twelve strings 23 each with ten panels 24. Though not depicted in FIG. 2, the other inverter DC/DC Booster Stages 15, 18 and 19 are also similarly connected to panels. Additionally the plant incorporates a weather station 25. The plant is connected to a grid via a plant grid connection 26 comprised of additional elements not depicted in FIG. 3. In this example it is given that the plant is grid connected, but it can also be applicable to off-grid, or isolated plant for example a microgrid with solar PV. In FIG. 3, locations of field devices which are connected to the SCADA system are highlighted as black diamonds. Let us assume we have the following signals available in the cleaned historical SCADA data:

AC Power out to Grid measured by field device 27
DC Power out from the first DC/DC Booster Stage 14 from the first solar inverter 12 measured by field device 28

DC Power out from the second DC/DC Booster Stage 15 from the first solar inverter 12 measured by field device 29

DC Power out from the first DC/DC Booster Stage 17 from the second solar inverter 13 measured by field device 30

DC Power out from the second DC/DC Booster Stage 18 from the first solar inverter 13 measured by field device 31

Horizontal Irradiance from Weather Station measured by field device 32

Ambient Temperature from Weather Station measured by field device 32

Firstly, by analyzing each tag it is established which components have power output signals associated with them. Note that in this example only power has been given as an output signal, but other signals could equally be considered. After this step, it would be recognized that power output signals are available from:

The first DC/DC Booster Stage 14 from the first solar inverter 12

The second DC/DC Booster Stage 15 from the first solar inverter 12

The first DC/DC Booster Stage 17 from the second solar inverter 13

The second DC/DC Booster Stage 18 from the second solar inverter 13

Plant grid connection 26

Figure 4:
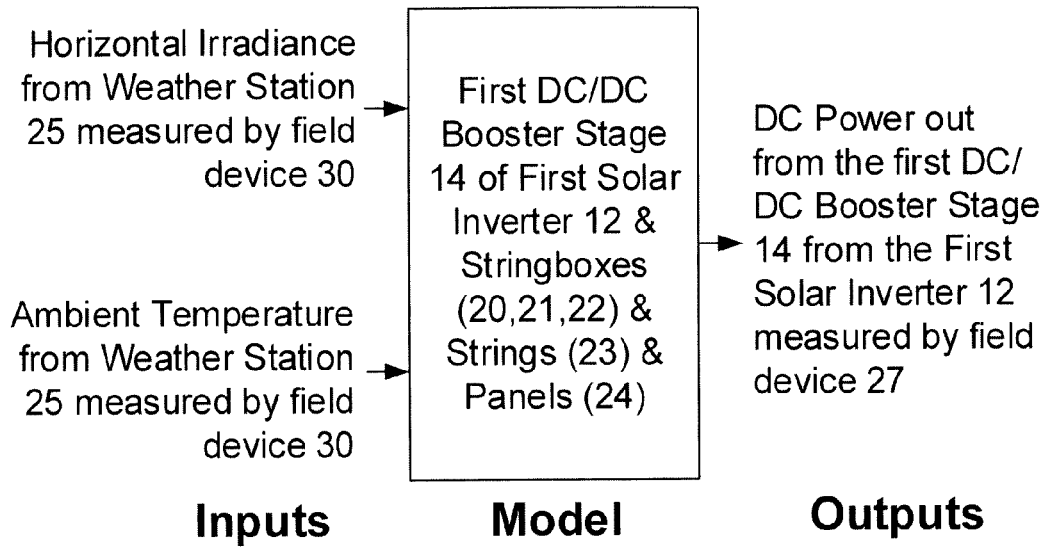
FIG. 4 presents a diagram of an input-output data relation that would be created by the system.

This indicates which components in the plant may potentially be modelled using the data contained within the cleaned historical SCADA data (i.e. for which components do input-output relations exist). The system can also identify that the Inverter DC/DC Booster Stage data is electrically connected between the power generation source (i.e. the sun) and the plant grid connection. Next the signals which are available for each component, starting with the components most closely connected electrically to the power generation source are identified. Starting with the 'first DC/DC Booster Stage 14 from the first solar inverter 12' component, it is identified that the 'DC Power out from the first DC/DC Booster Stage 14 from the first solar inverter 12 measured by field device 28' signal may be used as the output of an input-output relation for the component. The system also recognizes that there are no signals measured at components more closely connected electrically to the power generation source that may be used as inputs in the input-output relation for the component. Therefore the Horizontal Irradiance from Weather Station measured by field device 32 and the Ambient Temperature from Weather Station measured by field device 32 signals are assigned to be the input to the input-output relation for the component. The system also recognizes that the input-output relation describes the operation of not only the 'first DC/DC Booster Stage 14 from the first solar inverter 12' component but also all connected components between the weather input and the DC Power out from the first 'DC/DC Booster Stage 14 from the first solar inverter 12 measured by field device 28' namely the stringboxes, 20, 21 and 22, strings 23 and panels 24. Therefore the input-output relation describes a subsystem of connected components. This is illustrated in FIG. 4.

Figure 5:
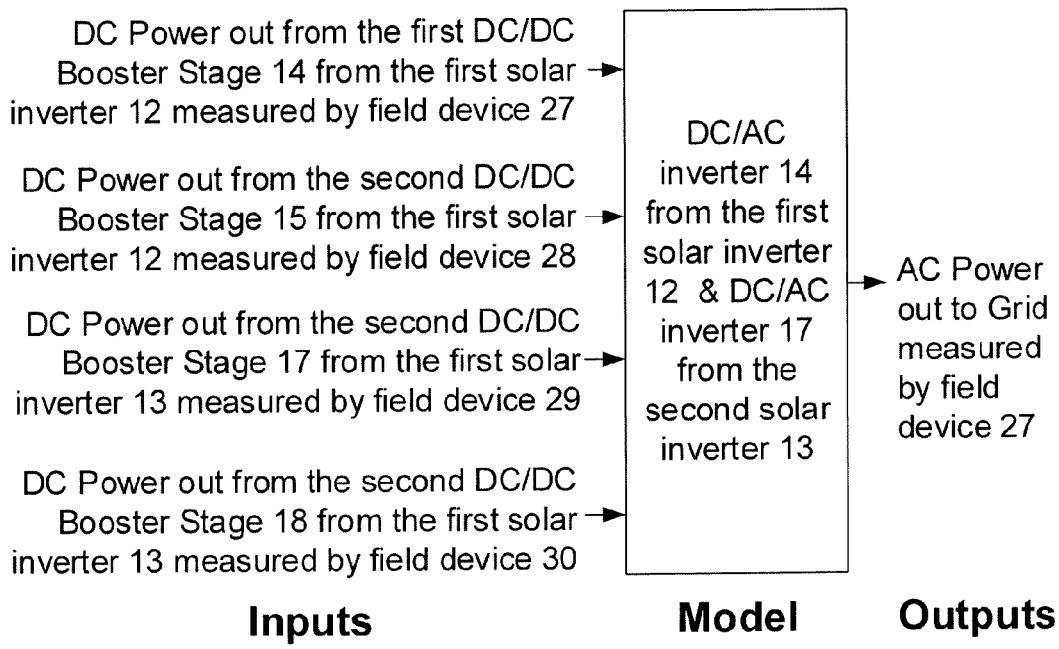
FIG. 5 presents a diagram of a further input-output data relation that would be created by the system.

Similar input-output relations would also be created for the other DC/DC Booster Stages in the plant. When the system moves to consider the input-output relation of the 'Plant grid connection 26', it would recognize that DC Power out signals from the various inverter DC/DC Booster Stages can be used as an input to the input-output relation and that the AC Power out to Grid can be used as the output of the input-output relation. This is illustrated in FIG. 5. In this illustrative example, the system would identify five input-output relations describing the plant (four DC/DC Booster Stages and one 'plant' connection to grid). In this way the algorithm is able to build input-output relations of each plant to the maximum possible granularity allowable by the available data.

The output of step S3 is a list of input-output relations in the plant 1; describing inputs and outputs that may be used to create data-driven models of subsystems within the plant 1. The list of input-output relations in the plant 1 and the cleaned historical SCADA data are used as inputs to step S4. Step S3 is performed in the model construction 9 submodule.

Step S4

At step S4 the list of input-output relations in the plant 1 are optimized according to the cleaned historical SCADA data which is available from step S2. Specifically the aim of this step is to maximize the amount of good quality training data that is available for each set of input-output relations in the plant 1. The system first establishes the total availability of data for a selected input-output relation as the ratio of the total number of days where all input and output signals of an input-output relation are 'good' and the total number of days between the start date for the cleaned historical SCADA data and the end date for the cleaned historical SCADA data. If the value of the total availability of data for a selected input-output relation is greater than a threshold value, then the algorithm decides that the selected input-output relation does not need to be optimized. The threshold value can take any value, however a representative value is 0.5 and this is the default value. If the value of the total availability of data for a selected input-output relation is lower than the threshold value then the system proceeds to remove the input with the greatest number of missing data points and reevaluate the total availability of data for the selected input-output relation. If the new value of the total availability of data for the selected input-output relation is now greater than a threshold value, then the optimization process is halted for this selected input-output relation and the system proceeds to optimizing the next input-output relation. If the new value of the total availability of data for the selected input-output relation is still lower than the threshold value, then the system proceeds to remove the input with the next greatest number of missing data points and reevaluate the total availability of data for the selected input-output relation. This process continues until the total availability of data for the selected input-output relation is greater than the threshold value. Should it be impossible to optimize the inputs and outputs of a selected input-output relation so that the 'model availability' exceeds the threshold, then the selected input-output relation is removed from the list of input-output relations. The output of step S4 is a list of optimized input-output relations. Step S4 is performed in the model construction 9 submodule. The list of optimized input-output relations is provided to the data-driven training 10 submodule.

Step S5

At step S5 on the basis of the optimized input-output relations and the cleaned historical SCADA data, one or more data-driven models are trained wherein each trained data-driven model represents one or more subsystems within the plant 1. Those skilled in the state of the art will recognize that a number of other approaches may be applied in order to build data-driven models including, for example Artificial Neural Networks, Gaussian processes or parameter estimation on the basis of regression. In the preferred embodiment, an artificial neural network approach has been selected for modelling the relationships between inputs and outputs, however it should be noted that other data-driven approaches may equally be utilized, without exceeding the scope of this invention. Optionally, the end user may provide parameter set P2 via the user interface 11. Parameter set P2 is comprised of a list of parameters controlling the structure and training of the data-driven models. Alternatively, default values may be utilized. For example, considering the preferred embodiment of the artificial neural networks the following training parameters might be considered:

- Number of hidden layers. As a default each artificial neural network would have a single hidden layer. The user may select a different number of hidden layers via the optional parameter set P2.
- Number of hidden layer neurons. As a default the number of neurons in each hidden layer is set equal to the number of inputs. The user may select a different number of neurons in each hidden layers via the optional parameter set P2.
- Maximum number of epochs. When considering feed-forward networks, where information is only transferred from the inputs to the outputs, a challenge arises due to the fact that the target values of hidden layers are unknown (hence it is difficult to evaluate the error at each neuron, and hence identify how to update the synaptic weights. In order to address this problem, back-propagation learning algorithms (which propagate patterns from input to output and errors from output back to the input) can be employed. Together, a forward and backward propagation is known as an epoch. This is the maximum number of epochs that the algorithm should perform. As a default the maximum number of epochs may be set to 2000, however the user may alter this via the optional parameter set P2.

During the training process, a training algorithm such as Levenberg-Marquardt or Gradient Descent is used to update the weights of the artificial neural network so that it is to estimate an output from one or more inputs. Standard approaches known in the state of the art, such as early stopping, or advanced weight initialization techniques may also be utilized. In the preferred embodiment artificial neural networks are trained on the basis of the optimized input-output relations using the data which is available in the cleaned historical SCADA data provided at step S2. As an output of step s5 one or more trained data-driven models are supplied to step s6. Step S5 is performed in the data-driven training submodule o10.

Step S6

At step s6 one or more metrics indicative of the difference between the outputs of the one or more trained data-driven models when the cleaned historical SCADA data is used as inputs and the equivalent measured values obtained from the cleaned historical SCADA data are calculated. An example metric, F, for a trained data-driven model, i, for a given sample, k, may be given as $$F_{i,k} = |y_{i,k}^* - y_{i,k}|.$$

where $y^*_{i,k}$ is the estimated output of model, i, at sample k and $y_{i,k}$ is the equivalent measured output at the same sample. This metric provides information on the instantaneous difference between the modelled and measured behavior. If it is assumed that our models were trained using only healthy data, then any increase in the metric will indicate that the real system is deviating away from the nominal healthy performance. When the deviation is greater than a certain threshold a fault warning may be indicated to the end user. Those skilled in the state of the art will recognize that other metrics comparing the outputs of the one or more trained data-driven models when the cleaned historical SCADA data is used as inputs and the equivalent measured values obtained from the cleaned historical SCADA data may also be calculated. Additionally, at this stage additional post-processing, for example using moving average filters may be applied.

For each metric, Fi, for a trained data-driven model, i, the system automatically sets an alarm threshold which, if the metric exceeds, would indicate a fault. In a particular embodiment, the system achieves through the use of kernel density estimation (KDE) (P.-P. Odiowei and Y. Cao, "Non-linear dynamic process monitoring using canonical variate analysis and kernel density estimations," Computer Aided Chemical Engineering, vol. 27, no. C, pp. 1557-1562) to fit probability density functions (PDF) describing the probability that a particular value of metric will be observed. These PDFs are subsequently used to define the alarm thresholds. As a default, the alarm threshold is set such that 99.9% of all of the values of a metric for a trained data-driven model, i, for the training period have a value lower than the alarm threshold. Users may optionally change the alarm thresholds via the optional parameter set P3 delivered via the user interface 11. Thus if desired, the users can select to make the algorithms more or less sensitive to certain faults in the plant (e.g. a critical component may have a lower alarm threshold than a less critical component). As an output of step S6 the calculated alarm thresholds are assigned to the associated one or more trained data-driven models. The resulting trained data-driven models are saved in the data storage and used in step S7. Step S6 is performed in the data-driven training 10 submodule.

Step S7

At step S7 new data is acquired from the SCADA system 2 connected to the plant 1. Here new data may indicate real-time data or the most recently stored data samples for each signal in the system. This new SCADA data is used as the input to step S8. Step S7 is performed by the communication module 4 in the computer device 3. The new SCADA data is provided to the condition assessment module 7 of the data processing unit 5.

Step S8

At step S8 the new SCADA data is input to the one or more trained data-driven models from step S6 in order to obtain new model outputs for each trained data-driven model. Specifically, a new model output for a particular trained data-driven model would be obtained running said trained data-driven model with the new SCADA data used as inputs. One or more metrics indicative of the difference between the new model outputs for each trained data-driven model and the equivalent measured values obtained from the new SCADA data are calculated. The same calculations as were conducted at step S6 are conducted at step S9 albeit using the new SCADA data. The one or more metric values for the new SCADA data are used as inputs to step S9. Step S8 is performed in the condition assessment module 7.

Step S9

At step S9 the values of the one or more metric values for the new SCADA data are compared against the associated alarm thresholds calculated at step S6. If the values of the one or more metric values for the new SCADA data exceed the associated alarm thresholds calculated at step S6, then the system moves to step S10, otherwise the system moves to step S11. Step S9 is performed in the condition assessment module 7.

Step S10

If in the preceding step S9 the values of the one or more metric values for the new SCADA data exceed the associated alarm thresholds calculated at step S6, then an alarm is indicated to the end user via the user interface 11. Furthermore, the subsystems comprised of one or more elements which are associated with the trained data-driven models in accordance with steps S1-S5, are highlighted as exhibiting anomalous behavior.

Step S11

At Step S11 the result of combining said data is stored in a memory of the data storage module.

Figure 6:
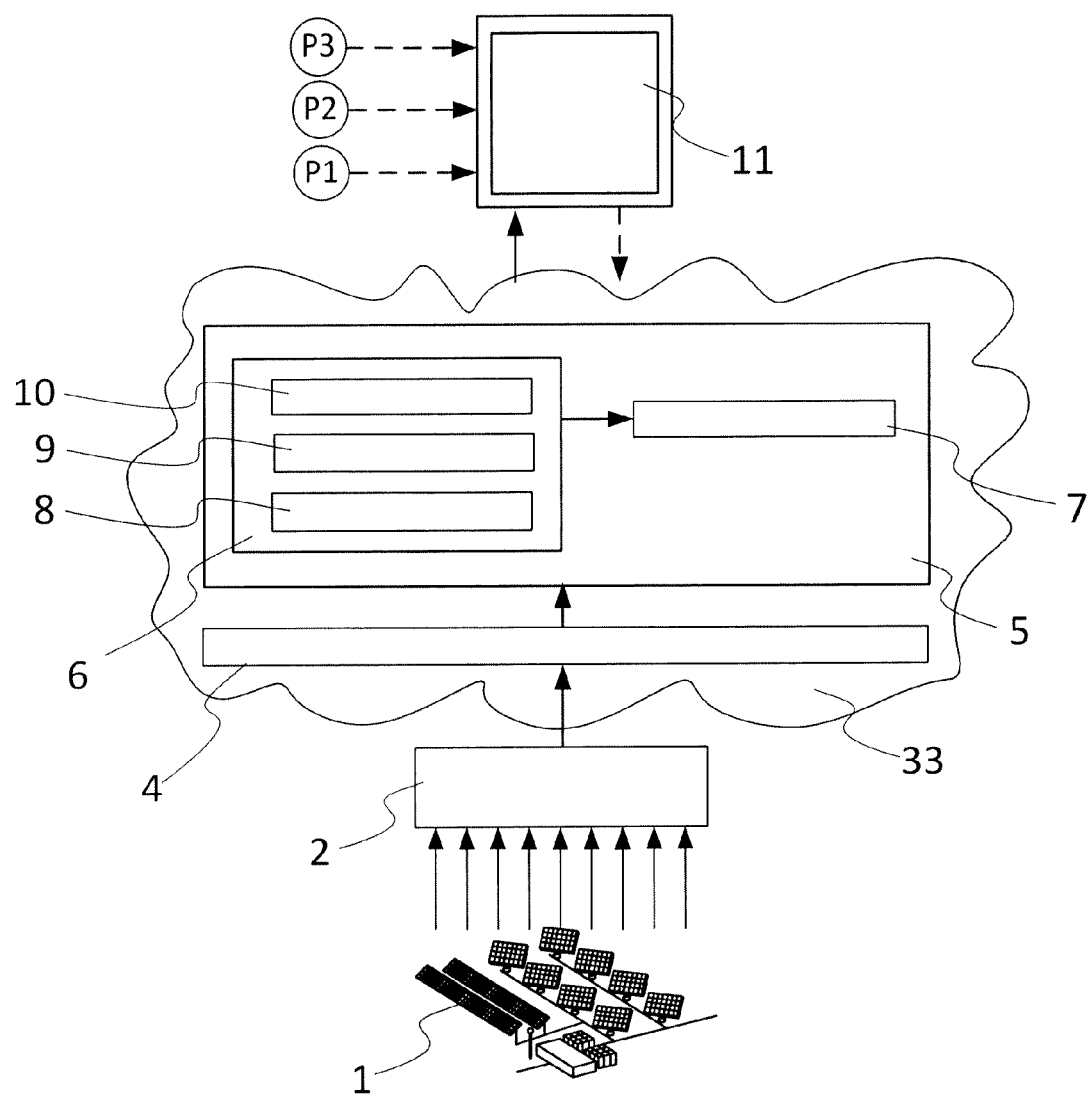
FIG. 6 is a picture of a renewable generation and/or microgrid system together with schematic view of the apparatus which may be used in the implementation of the present invention, highlighting function modules and submodules that may be located in a cloud of a cloud computing solution in accordance with a second embodiment of the present invention.

A second embodiment of inventive method where the computer device 3 and all associated sub-modules may be implemented across a range of computing devices as part of a cloud computing system. This is illustrated in FIG. 6, which is identical to FIG. 1 except for the fact that a cloud 33 has been substituted for the computer device 3 highlighting that the functional modules and submodules 4-10 that may be located in a cloud of a cloud computing solution.

The use of the invention according to previous embodiments wherein the future values of the one or more metric values for the new SCADA data is predicted on the basis of historical values of the one or more metric values for the new SCADA data stored at Step S11. In one such embodiment one or more polynomials are fitted to the historical values of the one or more metric values using regression techniques known in the state of the art in order to establish how the metric values varies with time. The one or more fitted polynomials are used to predict the future values of the one or more metric values. Those skilled in the state of the art will recognize that there are a range of approaches for predicting future values of a signal such as autoregressive integrated moving average (ARIMA) models, proportional-hazards models or recursive neural networks. The predicted future values of the one or more metric values are indicated to the end user via the user interface 11. If a predicted future values of a metric exceeds an associated threshold, the difference between the estimated time at which the metric exceeds its associated threshold and the current time are indicated to the end user via the user interface 11.

A further use of the invention according to previous embodiments wherein the trends of the one or more metric values for the new SCADA data is identified in order to track degradation of the one or more components in the plant 1. In one such embodiment one or more linear polynomials are fitted to the historical values of the one or more metric values using regression techniques known in the state of the art in order to establish how the metric values varies with time. The first order terms of the one or more fitted linear polynomials, which may be considered as indicative of the degradation or improvement of the one or more elements which are associated with the trained data-driven models in accordance with steps S1-S5, are indicated to the end user via the user interface 11.

The invention claimed is:

1. A method for monitoring the condition of subsystems within a renewable generation plant or microgrid, comprising the steps:
acquiring historical data which has previously been measured by one or more field devices connected to a number of input output devices used as part of a Supervisory Control and Data Acquisition (SCADA) system of the plant or microgrid,
removing unwanted data from the acquired historical data to obtain a cleaned historical SCADA data,
using the cleaned historical SCADA data to identify input-output data relations for each of the subsystems of the plant or microgrid, where, for any given subsystem of the subsystems, an input-output data relation is respectively a list of all signals contained within the cleaned historical SCADA data which is considered as an input to the given subsystem and a list of all signals contained within the cleaned historical SCADA data which is considered as an output to the same given subsystem,
selecting a combination of input-output data relations within the cleaned historical SCADA data which ensure that the availability of cleaned historical SCADA data for each input-output data relation exceeds a given threshold,
training separate data-driven models for each of the subsystems of the plant or microgrid using the cleaned historical SCADA data, wherein each trained data-driven model is optimized to be able to estimate the outputs of the subsystem for which the data-driven model is trained from the inputs to the subsystem for which the data-driven model is trained, where the inputs and outputs to the subsystem for which the data-driven model is trained are described by the selected input-output data relations,
establishing alarm thresholds for each trained data-driven model,
acquiring new data from the one or more field devices connected to a number of input output devices used as part of the SCADA system of the plant or microgrid,
inputting the new data from the one or more field devices connected to a number of input output devices used as part of the SCADA system of the plant or microgrid to the one or more trained data-driven models in order to obtain new model outputs for each trained data-driven model,
calculating one or more metrics indicative of the difference between the new model outputs for each trained data-driven model and the equivalent measured values obtained from the new data from the one or more field devices connected to a number of input output devices used as part of the SCADA system of the plant or microgrid,
identifying whether the one or more metrics respectively exceed the alarm thresholds established for the respective trained data-driven model and if yes, indicating an alarm to the end user via a human machine interface,
storing values of the one or more metrics indicative of the difference between the new model outputs for each trained data-driven model and the equivalent measured values obtained from the new data in a memory of a processor unit for estimating future values of the one or more metrics, or for estimating when future values of a metric exceed a threshold, or for estimating a degradation of each of the subsystems of the plant or microgrid.

2. The method according to claim 1, wherein the subsystem is defined as one or more connected components within the plant or microgrid for signals which are considered as an input to the subsystem and signals which are considered as an output to the subsystem both exist within the cleaned historical SCADA.

3. The method according to claim 2, wherein the subsystem is an individual component or a collection of connected components within the plant or microgrid.

4. The method according to claim 1, wherein the separate data-driven models for each subsystem of the plant or microgrid are artificial neural networks.

5. The method according to claim 1, wherein the plant or microgrid is a wind farm.

6. The method according to claim 1, wherein the plant or microgrid is a photovoltaic plant.

7. The method according to claim 1, wherein the step using the cleaned historical SCADA to identify input-output data relations for each subsystem of the plant or microgrid is performed using an expert system.

8. The method according to claim 1, wherein a computer device and all associated sub-modules are implemented across a range of computing devices as part of a cloud computing system.

9. The method according to claim 1, wherein the values of the one or more metrics for the new SCADA data that are stored in the memory of the processor unit are used to estimate future values of a metric.

10. The method according to claim 1, wherein the values of the one or more metrics for the new SCADA data that are stored in the memory of the processor unit are used to estimate when future values of a metric exceed a threshold.

11. The method according to claim 1, wherein the values of the one or more metrics for the new SCADA data that are stored in the memory of the processor unit are used to estimate degradation of each subsystem of the plant or microgrid.

12. A system for monitoring the condition of subsystems within a renewable generation plant or microgrid, the system comprising:
a computer device connected with a Supervisory Control and Data Acquisition (SCADA) system, both connected with a number of field devices of the renewable generation plant or microgrid, the computer device comprising:
a data storage comprising a computer-readable memory;
a data processor configured to execute program instructions, the program instructions when executed causes the data processor to:
acquiring, from the computer-readable memory of the data storage, historical data which has previously been measured by one or more field devices connected to a number of input output devices used as part of a Supervisory Control and Data Acquisition (SCADA) system of the plant or microgrid,
removing unwanted data from the acquired historical data to obtain a cleaned historical SCADA data,
using the cleaned historical SCADA data to identify input-output data relations for each of the subsystems of the plant or microgrid, where, for any given subsystem of the subsystems, an input-output data relation is respectively a list of all signals contained within the cleaned historical SCADA data which is considered as an input to the given subsystem and a list of all signals contained within the cleaned historical SCADA data which is considered as an output to the same given subsystem,
selecting a combination of input-output data relations within the cleaned historical SCADA data which ensure that the availability of cleaned historical SCADA data for each input-output data relation exceeds a given threshold,
training separate data-driven models for each of the subsystems of the plant or microgrid using the cleaned historical SCADA data, wherein each trained data-driven model is optimized to be able to estimate the outputs of the subsystem for which the data-driven model is trained from the inputs to the subsystem for which the data-driven model is trained, where the inputs and outputs to the subsystem for which the data-driven model is trained are described by the input-output data relations,
establishing alarm thresholds for each trained data-driven model,
acquiring new data from the one or more field devices connected to a number of input output devices used as part of the SCADA system of the plant or microgrid,
inputting the new data from the one or more field devices connected to a number of input output devices used as part of the SCADA system of the plant or microgrid to the one or more trained data-driven models in order to obtain new model outputs for each trained data-driven model,
calculating one or more metrics indicative of the difference between the new model outputs for each trained data-driven model and the equivalent measured values obtained from the new data from the one or more field devices connected to a number of input output devices used as part of the SCADA system of the plant or microgrid,
identifying whether the one or more metrics respectively exceed the alarm thresholds established for the respective trained data-driven model and if yes, indicating an alarm to the end user via a human machine interface,
storing values of the one or more metrics indicative of the difference between the new model outputs for each trained data-driven model and the equivalent measured values obtained from the new data in the computer-readable memory of the data storage for estimating future values of the one or more metrics, or for estimating when future values of a metric exceed a threshold, or for estimating a degradation of each of the subsystems of the plant or microgrid.

13. The system according to claim 12, wherein the step of using the cleaned historical SCADA data to identify input-output data relations for each subsystem of the plant or microgrid is performed using an expert system.

14. The system according to claim 12, wherein the computer device is implemented across a range of computing devices as part of a cloud computing system.

* * * * *